(12) United States Patent  
Higuchi et al.

(10) Patent No.: US 7,059,445 B2  
(45) Date of Patent: Jun. 13, 2006

(54) SEAT BELT DEVICE FOR AUTOMOBILE

(75) Inventors: Hitoshi Higuchi, Haga-gun (JP); Kenichi Saito, Kawachi-gun (JP); Nobuyuki Kawamura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 325 days.

(21) Appl. No.: 10/678,978

(22) Filed: Oct. 3, 2003

(65) Prior Publication Data  
US 2004/0070191 A1 Apr. 15, 2004

(30) Foreign Application Priority Data  
Oct. 10, 2002 (JP) ............... 2002-297221

(51) Int. Cl.  
*B60R 21/00* (2006.01)

(52) U.S. Cl. ............... 180/268; 280/801.2; 280/801.1; 280/806; 280/808

(58) Field of Classification Search ............ 280/801.1, 280/808, 807, 801.2, 806; 297/468, 483, 297/466, 467; 180/268; B60R 22/00, 22/12, B60R 22/10  
See application file for complete search history.

(56) References Cited  
U.S. PATENT DOCUMENTS

| | | | | |
|---|---|---|---|---|
| 4,437,628 A | * | 3/1984 | Schwartz | 244/122 AG |
| 4,488,691 A | * | 12/1984 | Lorch | 244/151 R |
| 4,720,064 A | * | 1/1988 | Herndon | 244/122 AG |
| 4,738,413 A | * | 4/1988 | Spinosa et al. | 244/151 R |
| 5,046,687 A | * | 9/1991 | Herndon | 244/122 AG |
| 5,660,445 A | * | 8/1997 | Murray | 297/485 |
| 6,076,894 A | * | 6/2000 | Busch | 297/484 |
| 6,729,693 B1 | * | 5/2004 | Soderstrom et al. | 297/484 |

FOREIGN PATENT DOCUMENTS

| | | |
|---|---|---|
| JP | 62-51065 | 3/1987 |
| JP | 3-109152 | 5/1991 |
| JP | 6-44655 | 6/1994 |
| JP | 2001-26233 | 1/2001 |
| JP | 2001-247010 | 9/2001 |
| JP | 2003-226224 | 8/2003 |

* cited by examiner

*Primary Examiner*—Paul N. Dickson  
*Assistant Examiner*—Drew J. Brown  
(74) *Attorney, Agent, or Firm*—Hamre, Schumann, Mueller & Larson, P.C.

(57) ABSTRACT

A seat belt device includes a shoulder belt portion for restraining the front portion of the upper half of the body of a passenger seated in an associated seat, a lap belt portion for restraining the thighs of the passenger, and a thigh belt portion which extends across a seat cushion of the associated seat so as to be disposed under the thighs of the passenger in use, and which is provided for restraining the thighs of the passenger together with the lap belt portion.

9 Claims, 4 Drawing Sheets

SEAT BELT DEVICE FOR AUTOMOBILE

BACKGROUND OF THE INVENTION

1. Field of the Invention

The present invention relates to a three-point set belt device for automobiles, and in particular, relates to a seat belt device including a thigh belt.

Priority is claimed on Japanese Patent Application No. 2002-297221, filed Oct. 10, 2002, the content of which is incorporated herein by reference.

2. Description of Related Art

Among seat belt devices for automobiles, a so-called three-point seat belt device (a lap and diagonal seat belt device) is known, which includes a shoulder belt (a diagonal belt) and a lap belt. A three-point seat belt device restrains the front portion of an upper half of the body of a passenger seated in the seat by the shoulder belt thereof, and restrains the front portion of the pelvis of the passenger by the lap belt thereof, so that the passenger is firmly restrained. Another seat belt device has been proposed, which improves the afore-mentioned seat belt device in such a manner that the abdomen of the passenger is not compressed even when a pregnant woman or a person having a disease in the abdomen is seated in the seat (see, for example, Japanese Unexamined Utility Model Application, First Publication No. Hei 06-44655).

This improved seat belt device will be further explained below with reference to FIG. 6. A seat belt 2, which is upwardly drawn from a retractor 1, is led through a through anchor 3. The end of the seat belt 2 is fixed to a body member 5, which is disposed at a position within the cabin closer to the outer side of the automobile cabin than a seat 4 (hereinafter referred to as an outer position with respect to the seat), using an outer anchor 6. Two self-guiding tongue plates 7 and 8 are attached to the middle portions of the seat belt 2. One of the self-guiding tongue plates, i.e., the self-guiding tongue plate 7 is engaged in a removable manner with a buckle 10 which is fixed to a body member 9 that is disposed at a position closer to the center of the automobile cabin than the seat 4 (hereinafter referred to as an inner position with respect to the seat), and the other of the self-guiding tongue plates, i.e., the self-guiding tongue plate 8 is engaged in a removable manner with another buckle 12 which is fixed to a seat frame 11 at a position in front of the seat 4. Accordingly, the portion of the seat belt 2 positioned between the self-guiding tongue plate 7 and the through anchor 3 acts as a shoulder belt 13, and another portion of the seat belt 2 positioned between the self-guiding tongue plate 7 and the outer anchor 6 acts as a lap belt 14 which restrains the thighs of the passenger.

In the above seat belt device, because the middle portion of the lap belt 14 is supported by the seat frame 11 at a position in front of the seat 4, the compressive force applied to the abdomen of the passenger is reduced, which is a superior property; however, the front portion of the pelvis of the passenger, which tends to move forward, still must be supported by the lap belt 14; therefore, the load applied to the passenger is not greatly reduced.

Moreover, when the passenger is a woman wearing a skirt, the woman tends to hesitate to fix the self-guiding tongue plate 8, which is another problem.

SUMMARY OF THE INVENTION

In view of the above circumstances, an object of the present invention is to provide a seat belt device which enables a great reduction in the load applied to a passenger, and which can be worn without hesitation.

In order to achieve the above object, the present invention provides a seat belt device including: a shoulder belt portion for restraining a front portion of the upper half of the body of a passenger seated in an associated seat; a lap belt portion for restraining the thighs the passenger; and a thigh belt portion which extends across a seat cushion of the associated seat so as to be disposed under the thighs of the passenger in use, and which is provided for restraining the thighs of the passenger together with the lap belt portion.

According to the seat belt device configured as described above, the thighs of the passenger can be restrained by the lap belt portion and the thigh belt portion.

The seat belt device may further include an outer through anchor which is disposed at an outer position with respect to the associated seat, and through which the lap belt portion runs; and an inner anchor which is disposed at an inner position with respect to the associated seat. An end of the thigh belt portion may continue to the lap belt portion at the outer through anchor, and the other end of the thigh belt portion may be fixed to the inner anchor.

According to the seat belt device configured as described above, the load applied to the lap belt portion can be transmitted to the shoulder belt portion and the thigh belt portion.

The seat belt device may further include a bar-shaped outer anchor which is disposed at an outer position of the associated seat while having a first end to which a distal end of the lap belt portion is connected and a second end to which a proximal end of the thigh belt portion is connected, the outer anchor being supported at a substantially middle portion thereof so as to be rotatable in the vertical direction; an inner anchor which is disposed at an inner position with respect to the associated seat, and to which the other end of the thigh belt portion is fixed; and an actuator associated with the outer anchor for rotating the outer anchor so that the thighs of the passenger are sandwiched and held between the lap belt portion and the thigh belt portion thigh belt portion. The actuator may be adapted to raise the second end of the outer anchor upon detection of an impact force.

According to the seat belt device configured as described above, the actuator makes the outer anchor rotate upon detection of an impact so that the thighs of the passenger are sandwiched and held between the lap belt portion and the thigh belt portion.

The seat belt device may further include a pre-tensioner which is disposed at an inner position or at an outer position with respect to the associated seat, and to which an end of the thigh belt portion is connected. The pre-tensioner may be adapted to wind the thigh belt portion upon detection of an impact.

According to the seat belt device configured as described above, because the pre-tensioner winds the thigh belt portion upon detection of an impact force, the thighs of the passenger are sandwiched and held between the lap belt portion and the thigh belt portion.

DETAILED DESCRIPTION OF THE INVENTION

Embodiments of the present invention will be explained below with reference to the appended drawings.

Figure 1:
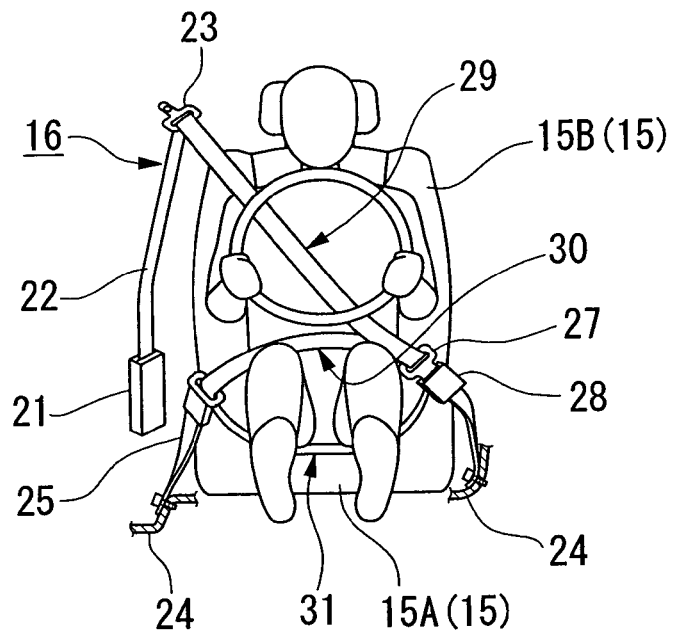
FIG. 1 is a front view showing a first embodiment of the present invention.

A first embodiment of the present invention will be explained below with reference to FIGS. 1 to 3. FIG. 1 is a front view showing a state in which a passenger is seated in a driver's seat and wears a seat belt device, FIG. 2 is a perspective view showing the seat and seat belt device, and FIG. 3 is a schematic diagram showing a state in which the seat belt is being worn.

Figure 2:
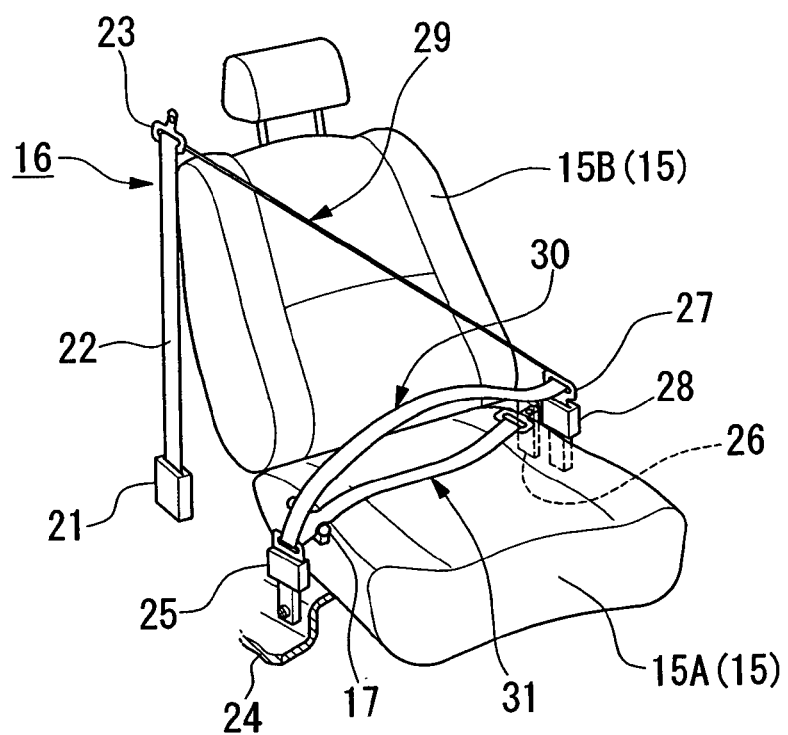
FIG. 2 is a perspective view showing the first embodiment of the present invention.
Figure 3:
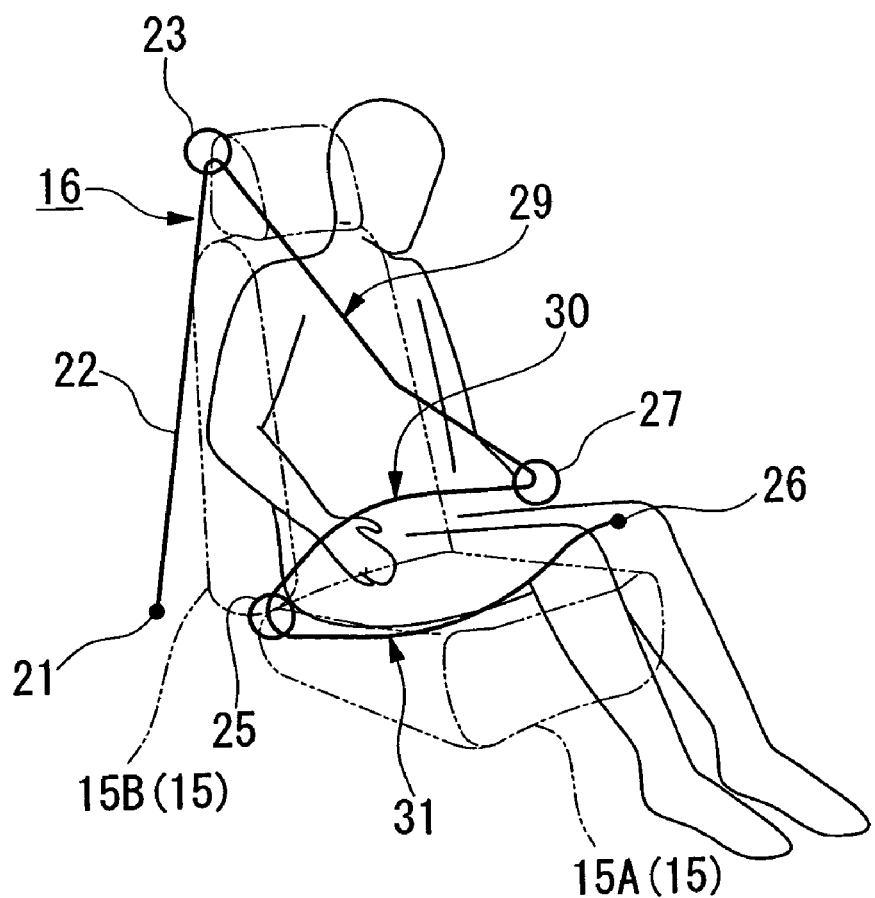
FIG. 3 is a schematic diagram showing the first embodiment of the present invention.

As shown in FIGS. 1 and 2, a seat 15 having a seat cushion 15A and a seatback 15B is provided with a three-point seat belt device 16. In the seat belt device 16, a seat belt 22, which is upwardly drawn from a retractor 21, is led through a through anchor 23 that is supported by a center pillar (not shown), is led through an outer through anchor 25 which is fixed to a floor 24 disposed at a position within the cabin closer to the outer side of the automobile cabin than the seat 15 (hereinafter referred to as an outer position with respect to the seat 15), and is led, as a thigh belt portion 31, above and across the seat cushion 15A of the seat 15. The end of the seat belt 22 is fixed to an inner anchor 26 (shown in FIG. 2) which is fixed to the floor 24 disposed at a position closer to the center of the automobile cabin than the seat 15 (hereinafter referred to as an inner position with respect to the seat 15).

The seat belt 22 is provided with a self-guiding tongue plate 27 at a position between the through anchor 23 and the outer through anchor 25. The self-guiding tongue plate 27 is engaged, in a disengageable manner, with a buckle 28 which is fixed to the floor 24 disposed at an inner position with respect to the seat 15. A guide roller 17 is provided with the seat cushion 15A at a position corresponding to the proximal end of the thigh belt portion 31 in order to facilitate movement of the thigh belt portion 31.

Accordingly, when a driver is getting into the seat, the driver sits on the seat cushion 15A and the thigh belt portion 31 disposed on the seat cushion 15A when the self-guiding tongue plate 27 is not engaged with the buckle 28, and then the driver engages the self-guiding tongue plate 27 with the buckle 28 to wear the seat belt device 16.

When the seat belt device 16 is being worn, the portion of the seat belt 22 positioned between the self-guiding tongue plate 27 and the through anchor 23 acts as a shoulder belt portion 29 that restrains the front portion of the upper half of the body of a passenger, the portion of the seat belt 22 positioned between the self-guiding tongue plate 27 and the outer through anchor 25 acts as a lap belt portion 30 that restrains the thighs of the passenger, and the portion of the seat belt 22 positioned between the outer through anchor 25 and the inner anchor 26 acts as the thigh belt portion 31 that is disposed between the thigh of the passenger and the seat cushion 15A. As schematically shown in FIG. 3, the single and continuous seat belt 22 includes the shoulder belt portion 29, the lap belt portion 30, and the thigh belt portion 31.

In the first embodiment, when the passenger is moving forward due to an impact while the seat belt device 16 is being worn, tension is applied to the portion of the seat belt 22 positioned between the inner anchor 26 and the retractor 21 that prohibits drawing of the seat belt 22. In other words, the tension is shared by the shoulder belt portion 29, the lap belt portion 30, and the thigh belt portion 31. As a result, the front portion of the upper half of the body of the passenger is restrained by the shoulder belt portion 29, and the thighs of the passenger are restrained by the lap belt portion 30 and the thigh belt portion 31.

In particular, when a so-called submarine phenomenon, in which the passenger moves forward through a space between the lap belt portion 30 and the seat cushion 15A, is about to occur, the phenomenon is prevented because the thigh belt portion 31 prohibits the forward movement of the thighs of the passenger. Therefore, the forward movement of the passenger can be reliably prevented, and thus reliability can be improved.

Accordingly, because the load applied to the lap belt portion 30 is transmitted not only to the shoulder belt portion 29, but also to the thigh belt portion 31, the load applied from the lap belt portion 30 to the abdomen of the passenger can be greatly reduced.

As a result, even a pregnant woman or a person having a disease in the abdomen can wear the seat belt device 16 without problems. In addition, even a woman wearing a skirt will use the seat belt device 16 without hesitation.

Figure 4:
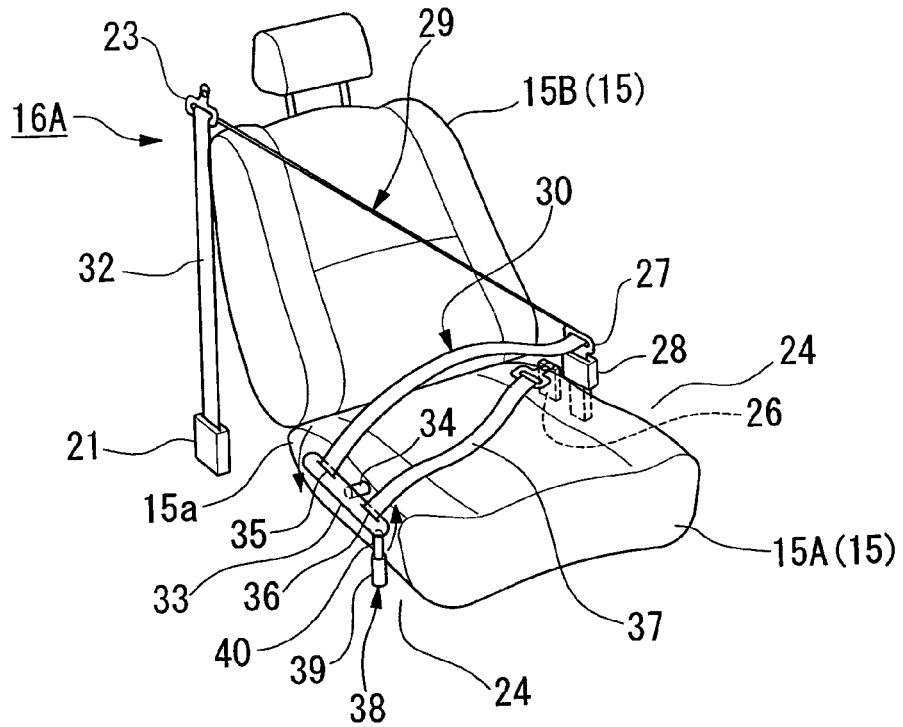
FIG. 4 is a perspective view showing a second embodiment of the present invention.

Next, a second embodiment of the present invention will be explained below with reference to FIG. 4. FIG. 4 is a perspective view corresponding to FIG. 2. Note that the same reference symbols are applied to the same elements as in the first embodiment.

As shown in FIG. 4, in a seat belt device 16A, a seat belt 32, which is upwardly drawn from the retractor 21, is led through a through anchor 23 that is supported by a center pillar (not shown). The end of the seat belt 32 is fixed to an outer anchor 33 which is provided on a side wall 15a of the seat cushion 15A disposed at an inner position with respect to the seat cushion 15A.

The outer anchor 33, which is a bar-shaped element having a shaft 34 at approximately the middle thereof, is supported by the shaft 34 so as to be rotatable in the vertical direction about the shaft 34. The outer anchor 33 is provided at a first end thereof with a seat belt attachment portion for the seat belt 32, and is provided at a second end thereof with a thigh belt attachment portion 36 for a thigh belt 37 that will be explained below. The outer anchor 33 may be provided on the floor 24 disposed at an outer position with respect to the seat 15.

The seat belt 32 is provided with a self-guiding tongue plate 27 at the middle position between the through anchor 23 and the outer anchor 33. The self-guiding tongue plate 27 is engaged, in a disengageable manner, with a buckle 28 which is fixed to the floor 24 disposed at an inner position with respect to the seat 15.

An end of the thigh belt 37 is fixed to the thigh belt attachment portion 36 for the thigh belt 37 disposed at the second end of the outer anchor 33. The other end of the thigh belt 37 is fixed to the inner anchor 26 while the thigh belt extends across the seat cushion 15A.

Between the other end of the outer anchor 33 and the floor 24 disposed at an outer position with respect to the seat 15, there is provided an actuator 38 which makes the outer anchor 33 rotate about the shaft 34 in the counterclockwise direction as viewed from the outside of the cabin when an impact force is applied.

The actuator 38 operates upon detection of an impact in such a manner that a rod 40 projects from an actuator body 39 that is fixed to the floor 24 so as to raise the other end of the outer anchor 33 which is connected to an end of the rod 40 to rotate the outer anchor 33.

Accordingly, when a driver is getting into the seat, the driver sits on the seat cushion 15A and the thigh belt 37 disposed on the seat cushion 15A when the self-guiding tongue plate 27 is not engaged with the buckle 28, and then the driver engages the self-guiding tongue plate 27 with the buckle 28 to wear the seat belt device 16A.

When the seat belt device 16A is being worn, the portion of the seat belt 32 positioned between the self-guiding tongue plate 27 and the through anchor 23 acts as the shoulder belt portion 29 that restrains the front portion of the upper half of the body of a passenger, and the portion of the seat belt 32 positioned between the self-guiding tongue plate 27 and the outer anchor 33 acts as the lap belt portion 30 that restrains the thighs of the passenger.

In the second embodiment, when the passenger is moving forward due to an impact while the seat belt device 16A is being worn, tension is applied to the portion of the seat belt 32 positioned between the outer anchor 33 and the retractor 21 that prohibits drawing of the seat belt 32. Upon detection of an impact force, the rod 40 in the actuator 38 projects so as to rotate the outer anchor 33 about the shaft 34 (as indicated by the arrows in FIG. 4); therefore, the thighs of the passenger are sandwiched and held between the lap belt portion 30 that is pressed downward and the thigh belt 37 that is raised upward.

Accordingly, the passenger does not feel restrained by the thigh belt 37 under normal conditions because the actuator 38 does not operate, while on the other hand, upon detection of an impact force, the load applied to the abdomen of the passenger is minimized due to the lap belt portion 30 and the thigh belt 37 so that the submarine phenomenon is prevented, and the thighs of the passenger can be reliably restrained.

Figure 5:
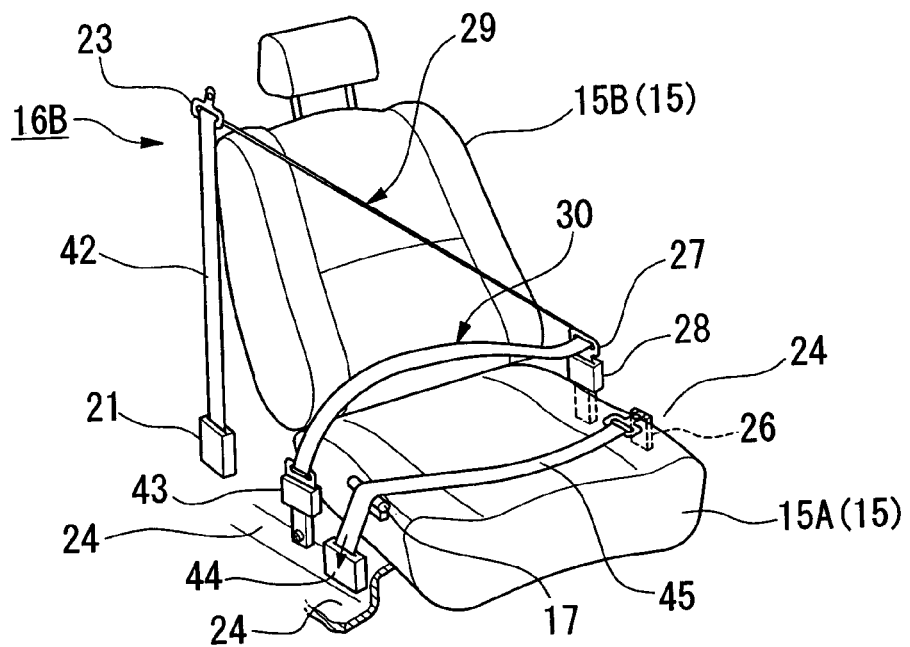
FIG. 5 is a perspective view showing a third embodiment of the present invention.
Figure 6:
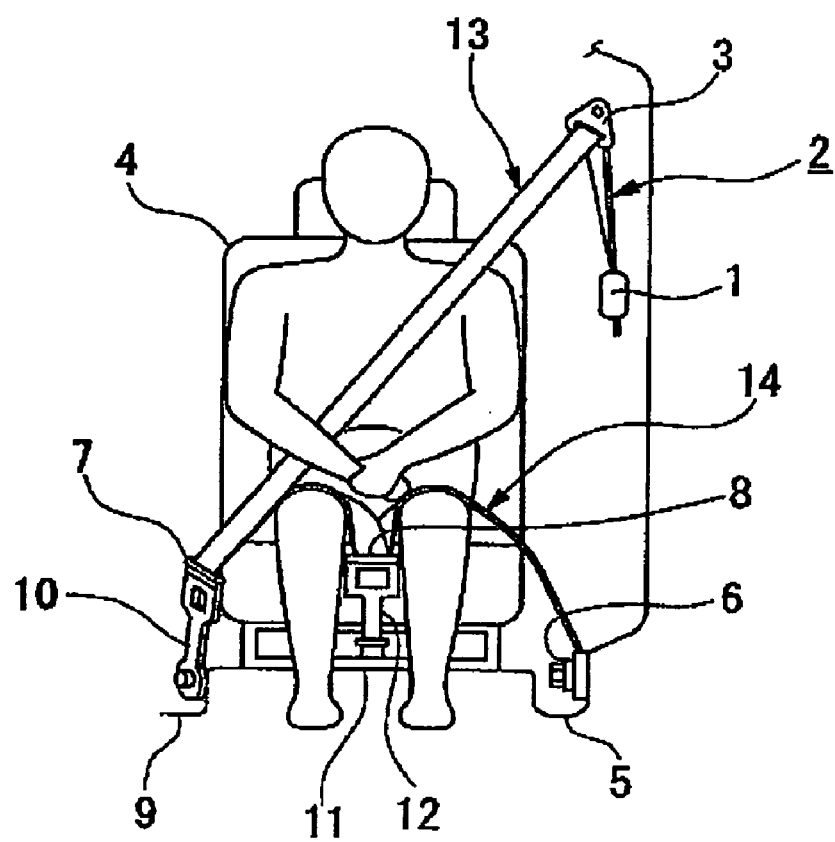
FIG. 6 is a front view showing a related art.

Next, a third embodiment of the present invention will be explained below with reference to FIG. 5. FIG. 5 is a perspective view corresponding to FIG. 2. Note that the same reference symbols are applied to the same elements as in the first embodiment.

As shown in FIG. 5, in a seat belt device 16B, a seat belt 42, which is upwardly drawn from the retractor 21, is led through a through anchor 23 as in the previous embodiments. The end of the seat belt 42 is fixed to an outer anchor 43 which is fixed to the floor 24 disposed at an outer position with respect to the seat 15.

The seat belt 42 is provided with a self-guiding tongue plate 27 at the middle position between the through anchor 23 and the outer anchor 43. The self-guiding tongue plate 27 is engaged, in a disengageable manner, with a buckle 28 which is fixed to the floor 24 disposed at an inner position with respect to the seat 15.

When the seat belt device 16B is being worn, the portion of the seat belt 42 positioned between the self-guiding tongue plate 27 and the through anchor 23 acts as the shoulder belt portion 29 that restrains the front portion of the upper half of the body of a passenger, and the portion of the seat belt 42 positioned between the self-guiding tongue plate 27 and the outer anchor 43 acts as the lap belt portion 30 that restrains the thighs of the passenger.

Moreover, a pre-tensioner 44 with retractor is fixed to the floor 24 disposed at an outer position with respect to the seat cushion 15A. A thigh belt 45 that extends across the seat cushion 15A is fixed to the pre-tensioner 44 at an end thereof, and is fixed at the other end thereof to the inner anchor 26 which is disposed in the inner part of the compartment. The seat cushion 15a is provided with a guide roller 17 which enables a smooth movement of the thigh belt 45.

Accordingly, when a driver is getting into the seat, the driver sits on the seat cushion 15A and the thigh belt 45 disposed on the seat cushion 15A when the self-guiding tongue plate 27 is not engaged with the buckle 28, and then the driver engages the self-guiding tongue plate 27 with the buckle 28 to wear the seat belt device 16B.

When the seat belt device 16B is being worn, the portion of the seat belt 42 positioned between the self-guiding tongue plate 27 and the through anchor 23 acts as the shoulder belt portion 29 that restrains the front portion of the upper half of the body of a passenger, and the portion of the seat belt 42 positioned between the self-guiding tongue plate 27 and the outer anchor 43 acts as the lap belt portion 30 that restrains the thighs of the passenger.

The pre-tensioner 44 may be fixed to the floor 24 disposed at an inner position with respect to the seat cushion 15A, and the end of the thigh belt 45 that is drawn from the pre-tensioner may be fixed to the floor 24 disposed at an outer position with respect to the seat cushion 15A via an outer anchor (not shown).

In the third embodiment, when the passenger is moving forward due to an impact while the seat belt device 16B is being worn, tension is applied to the portion of the seat belt 42 positioned between the outer anchor 43 and the retractor 21 that prohibits drawing of the seat belt 42. The front portion of the upper half of the body of the passenger is restrained by the shoulder belt portion 29, and the thighs of the passenger is restrained by the lap belt portion 30. Upon detection of an impact force, because the pre-tensioner 44 instantly winds the thigh belt 45 as indicated by the arrow in FIG. 5, the thigh belt 45 is raised upward; therefore, the thighs of the passenger are sandwiched and held between the lap belt portion 30 and the thigh belt 45.

Accordingly, the passenger does not feel restrained by the thigh belt 45 under normal conditions because the pre-tensioner 44 does not operate, while on the other hand, upon detection of an impact force, the load applied to the abdomen of the passenger is minimized due to the lap belt portion 30 and the thigh belt 45 so that the submarine phenomenon is prevented, and the thighs of the passenger can be reliably restrained.

The present invention is not limited to the above embodiments. As an alternative example, a link mechanism may be employed instead of the outer anchor 33 shown in FIG. 4 in order to press the lap belt portion downward and to raise the thigh belt 37 upward upon operation of the actuator 38.

Advantageous Effects of the Invention

According to the seat belt device of the present invention, because the thighs of the passenger can be restrained by the lap belt portion and the thigh belt portion, the load applied from the lap belt portion to the abdomen of the passenger can be reduced when compared with the case in which the thighs of the passenger is restrained only by the lap belt portion. As a result, even a pregnant woman or a person having a disease in the abdomen can be seated in the seat without having a problem of compression in the abdomen. In addition, even a woman wearing a skirt will use the seat belt device without hesitation, which could not be achieved in the conventional case in which the middle portion of the lap belt portion is fixed.

According to another seat belt device of the present invention, because the load applied to the lap belt portion can be transmitted to the shoulder belt portion and the thigh belt portion, the load applied from the lap belt portion to the abdomen of the passenger can be further reduced.

According to another seat belt device of the present invention, the actuator makes the outer anchor rotate upon detection of an impact so that the thighs of the passenger are sandwiched and held between the lap belt portion and the thigh belt portion. Therefore, the thighs of the passenger can be reliably restrained by the lap belt portion and the thigh belt portion only when an impact force is detected while the load applied to the abdomen of the passenger is minimized. Accordingly, the passenger does not feel restrained by the thigh belt under normal conditions.

According to another seat belt device of the present invention, the pre-tensioner winds the thigh belt upon detection of an impact so that the thighs of the passenger are sandwiched and held between the lap belt portion and the thigh belt portion. Therefore, the thighs of the passenger can be reliably restrained by the lap belt portion and the thigh belt portion only when an impact force is detected while the load applied to the abdomen of the passenger is minimized. Accordingly, the passenger does not feel restrained by the thigh belt under normal conditions.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A seat belt device comprising:
   a shoulder belt portion for restraining the front portion of the upper half of the body of a passenger seated in an associated seat, the shoulder belt portion extending generally diagonally across the upper half of the body of the passenger;
   a lap belt portion that has a length sufficient to extend across the thighs of the passenger for restraining the thighs of the passenger, and wherein the lap belt portion is to be disposed above the thighs of the passenger from one end of the lap belt to an opposite end thereof; and
   a thigh belt portion that has a length sufficient to extend across a seat cushion of the associated seat so as to be disposed under the thighs of the passenger between the thighs and an upper surface of the seat cushion, and which is provided for restraining the thighs of the passenger together with the lap belt portion.

2. A seat belt device according to claim 1, further comprising:
   an outer through anchor which is disposed at an outer position with respect to the associated seat, and through which the lap belt portion runs; and
   an inner anchor which is disposed at an inner position with respect to the associated seat, wherein
   an end of the thigh belt portion continues to the lap belt portion at the outer through anchor, and the other end of the thigh belt portion is fixed to the inner anchor.

3. A seat belt device according to claim 1, further comprising:
   a bar-shaped outer anchor which is disposed at an outer position of the associated seat while having a first end to which a distal end of the lap belt portion is connected and a second end to which a proximal end of the thigh belt portion is connected, the outer anchor being supported at a substantially middle portion thereof so as to be rotatable in the vertical direction;
   an inner anchor which is disposed at an inner position with respect to the associated seat, and to which the other end of the thigh belt portion is fixed; and
   an actuator associated with the outer anchor for rotating the outer anchor so that the thighs of the passenger are sandwiched and held between the lap belt portion and the thigh belt portion thigh belt portion.

4. A seat belt device according to claim 3, wherein the actuator is adapted to raise the second end of the outer anchor upon detection of an object.

5. A seat belt device according to claim 1, further comprising;
   a pre-tensioner which is disposed at an inner position or at an outer position with respect to the associated seat, and to which an end of the thigh belt portion is connected.

6. A seat belt device according to claim 5, wherein pre-tensioner is adapted to wind the thigh belt portion upon detection of an impact.

7. A seat belt device according to claim 1, wherein the shoulder belt portion is integrally connected to the lap belt portion, and further comprising a self-guiding tongue plate at the juncture between the shoulder belt portion and the lap belt portion.

8. A seat belt device comprising:
   a shoulder belt portion for restraining the front portion of the upper half of the body of a passenger seated in an associated seat;
   a lap belt portion for restraining the thighs of the passenger;
   a thigh belt portion which extends across a seat cushion of the associated seat so as to be disposed under the thighs of the passenger, and which is provided for restraining the thighs of the passenger together with the lap belt portion;
   a bar-shaped outer anchor which is disposed at an outer position of the associated seat while having a first end to which a distal end of the lap belt portion is connected and a second end to which a proximal end of the thigh belt portion is connected, the outer anchor being supported at a substantially middle portion thereof so as to be rotatable in the vertical direction;
   an inner anchor which is disposed at an inner position with respect to the associated seat, and to which the other end of the thigh belt portion is fixed; and
   an actuator associated with the outer anchor for rotating the outer anchor so that the thighs of the passenger are sandwiched and held between the lap belt portion and the thigh belt portion thigh belt portion.

9. A seat belt device according to claim 8, wherein the actuator is adapted to raise the second end of the outer anchor upon detection of an object.

* * * * *